United States Patent Office 2,952,713
Patented Sept. 13, 1960

2,952,713
PROCESS FOR THE SEPARATION OF CHLORINATED HYDROCARBON COMPONENTS

Joseph C. Pallenberg and Wilbur H. Petering, Detroit, Mich., assignors to Detrex Chemical Industries, Inc., Detroit, Mich., a corporation of Michigan No Drawing. Filed Nov. 10, 1958, Ser. No. 772,710

7 Claims. (Cl. 260—654)

This application is a continuation-in-part of our co-pending application Ser. No. 598,209, filed July 16, 1956, and now abandoned.

This invention relates to a process for separating some crude mixtures of chlorinated hydrocarbons into their component parts and more particularly to such process in which the chlorinated hydrocarbon components include polychlorethanes, polychlorethylenes and polychlormethanes.

The usual commercial procedures for the production of polychlorinated ethanes and ethylenes begin with a chlorination step in which ethane, ethylene or acetylene is chlorinated in either the liquid or vapor phase. The chlorination step results in a mixture of polychlorinated ethanes and ethylenes which may also contain small quantities of polychlorinated methanes. Whether the resulting mixture is to be directly separated into its components or first subjected to a dehydrochlorination step, the pure components can be recovered only by use of a subsequent separation step. The separation step usually used is a fractional distillation. During this fractional distillation it is often found that clean cuts of the components present cannot be obtained. Moreover, the usual fractionation is found to involve inordinately large percentages of some of the components distilling over at temperatures slightly below their correct boiling points. Volatile acidic compounds are also evolved during the distillation and quantities of coke, tar and higher boiling products are formed. The general result is a poor distillation product accompanied by fouling and corrosion of the equipment used, together with low recoveries of useful and valuable compounds.

When synthetic mixtures of the pure chlorinated hydrocarbons involved are made up, it is found that these can be fractionally distilled into their components without difficulty. The only cuts then obtained which do not correspond in boiling points to the pure compounds, except for the case of compounds which boil too close together for the efficiency of the column used, are found to be the well-known azeotropes formed by several of the chlorinated hydrocarbons involved. Examples of these well-known azeotropes are:

Perchlorethylene-1,1,2-trichlorethane
Trichlorethylene-1,2-dichlorethane

The useful and valuable chlorinated hydrocarbons which may be found in the reaction products of the chlorination process include the following compounds:

(a) Polychlormethanes - methylene chloride, chloroform, carbon tetrachloride (b) Polychlorethanes - 1,1 - dichlorethane; 1,2-dichlorethane; 1,1,1-trichlorethane; 1,1,2-trichlorethane; 1,1,2,2-tetrachlorethane; 1,1,1,2 - tetrachlorethane; pentachlorethane (c) Polychlorethylenes-1,1-dichlorethylene; both 1,2-dichlorethylenes; trichlorethylene; perchlorethylene It will be understood that not all of the above compounds are normally present at once. In fact, only a comparatively small number of these compounds may be present in any particular mixture, depending on its origin.

The fact that crude mixtures of the above compounds made by chlorination procedures often cannot be satisfactorily fractionally distilled and that corresponding synthetic mixtures made up of the individual pure compounds in the appropriate amounts can be satisfactorily fractionated leads to the conclusion that the crude industrial mixtures contain an impurity or impurities of unknown composition. The origin of these impurities and their composition is not definitely known.

It has now been discovered that heating these mixtures with solid anhydrous ferric chloride in appropriate amount, but preferably approximately one percent by weight or more, will destroy these unknown impurities without giving rise to large losses of useful and valuable products. This makes a subsequent separation by fractional distillation possible.

In accordance with the process of this invention, the moisture free mixture of chlorinated hydrocarbons is heated with anhydrous ferric chloride until the evolution of volatile acidic products ceases. The heating is preferably carried out in a steel reactor fitted with a stirrer and a reflux condenser with a vent. Nitrogen or other inert gas is passed through the reactor dome after the charge has completely reacted to remove acidic gases and protect the charge from the air. The heat is then removed and the charge cooled to below its steam distillation point. When the charge is sufficiently cool it may be washed with a solution of mild alkali such as sodium carbonate to remove ferric chloride and any dissolved free acid. If appropriate, one or more of the well-known volatile stabilizers for the chlorinated hydrocarbons involved may be added after the alkaline wash. The mixture is then steam distilled with or without a previous separation from the alkaline aqueous layer. The steam distillation temperature is determined by the compounds present and their concentrations. The resulting distillate is separated from the water layer, dried, and fractionally distilled into its components.

The time required for carrying out the chemical treatment of the present invention is dependent on the temperature, the time being less for higher temperatures, but a minimum temperature of 70° C. is required. For example, in the case of perchlorethylene treated at its boiling point (121° C.), the time required is 8 to 18 hours, whereas for tetrachlorethane treated at its boiling point (146° C.), a considerably shorter time is sufficient. The exact treatment time varies with the particular chlorinated hydrocarbon or mixture being treated.

In carrying out the process of this invention the ferric chloride is added to the crude dried liquid chlorinated hydrocarbon mixture, preferably in finely divided anhydrous form. The ferric chloride can conveniently be slurried in the dried crude chlorinated hydrocarbon to be treated and added as the slurry. The amount of ferric chloride required to render a mixture readily separable is related to the amount of impurities present. Since the exact nature of the impurities is unknown and no reliable method is at present available for the quantitative determination of the amounts present, it is necessary to determine experimentally on a small scale by the method of this invention the approximate amount of ferric chloride required, and then to use in the commercial treatment this amount of ferric chloride with some excess. It has been found that about 1% by weight of anhydrous ferric chloride is usually satisfactory for the treatment of most impure chlorinated hydrocarbon mixtures, since any excess above that actually needed has no deleterious effect on the chlorinated hydrocarbons. However, since the amount of impurities may vary, so that in some cases more than 1% of ferric chloride is required, we do not wish to be limited to this specific amount of ferric chloride.

While it is possible to adopt minor variations in the steps of the present invention without departing from the scope thereof, there are a number of matters which are of vital importance and these are not subject to variation in carrying out the process of the present invention. Among these is included the requirement that ferric chloride be employed. It is also essential that the ferric chloride be in solid form and that it be substantially anhydrous. Also, as regards temperature, it is essential that the chemical treatment step be carried out at 70° C. or above, preferably at the boiling point of the mixture to be treated.

It has been found that some of the polychlorinated ethanes which may be present in mixtures chosen for treatment by the process of the present invention are more or less susceptible to dehydrochlorination. The less symmetrical (more asymmetrical) polychlorethanes seem to be more readily dehydrochlorinated than more symmetrical (less asymmetrical) polychlorethanes. The rate of dehydrochlorination may also depend on both the temperature and the quantity of ferric chloride present. This incidental side reaction does not lead to losses of useful and valuable compounds. This is true because ferric chloride does not cause condensation or polymerization reactions in the system involved in the present invention. The products of these incidental dehydrochlorination side reactions are useful and valuable compounds which can be recovered by the usual well known separation methods such as fractional distillation.

In this connection it has been found that another anhydrous metallic chloride, namely, anhydrous aluminum chloride, which is disclosed in U.S. Patent No. 2,000,881, does not have the same action as the anhydrous ferric chloride of the present invention. At the conditions used in the treatment step of the present invention anhydrous aluminum chloride dehydrochlorinates all saturated polychlorethanes containing hydrogen and brings about condensation and polymerization reactions between the components present in mixtures of the type involved here. Aluminum chloride can thus be used only for the purification of perchlorolefins and is not suitable for use in a treatment intended as a preliminary step in the separation of a mixture into its components as in the present invention. If a mixture containing perchlorethylene, for example, as the principal component is treated with excess aluminum chloride only the perchlorethylene can generally be recovered. If anhydrous ferric chloride is used the mixture can be subsequently fractionated into its components.

While in describing the process of the present invention we have included four examples directed to the separation of mixtures containing specific chlorinated hydrocarbons, we do not intend that the claims of the present patent be limited to the process of rendering separable mixtures containing only these particular chlorinated hydrocarbons since the process of the present invention is equally applicable to mixtures containing others among the chlorinated hydrocarbons referred to in the present specification.

The procedure to be used for other mixtures of the chlorinated hydrocarbons disclosed above is the same except for necessary variations in quantity of anhydrous ferric chloride and time of heating.

Likewise, the rendering separable of impure mixtures of chlorinated hydrocarbons in large quantities is included within the scope of the present invention.

EXAMPLE 1

The mixture chosen for treatment was a sample of a crude by-product perchlorethylene. This sample showed a boiling range of about 10° C. in a standard boiling range determination. The mixture could not be separated into its components by fractional distillation before treatment.

One liter of the crude material was placed in a two liter boiling flask with 15–20 grams of finely divided anhydrous ferric chloride. The flask was fitted with a reflux condenser and the contents boiled for 12 hours. During this period volatile acidic decomposition products of the impurities present were evolved and absorbed in water. These decomposition products included measurable quantities of HCl and $CO_2$. At the end of the reflux period, after evolution of volatile products had ceased, the reaction product was dumped into alkaline water, washed, stabilized and steam distilled. The organic layer recovered from the steam distillation was dried and fractionally distilled.

The fractional distillation gave 3% trichlorethylene, 0.4% of the azeotrope containing 1,1,2-trichlorethane and perchlorethylene, 96% perchlorethylene and 0.1% 1,1,2,2-tetrachlorethane. Total recovery was 98.5%.

EXAMPLE 2

A sample of a crude perchlorethylene made by chlorination of a saturated aliphatic hydrocarbon at high temperature and which had been permitted to stand in light and air for a long period without stabilization was chosen for treatment. The sample had become very acid and had a very strong odor of phosgene.

One liter of this material was placed in a two liter boiling flask with 25 grams of finely divided anhydrous ferric chloride. The flask was fitted with a reflux condenser and the contents boiled for 12 hours. During this period volatile acidic decomposition products of the impurities present were evolved and absorbed in water. These decomposition products included measurable quantities of HCl and $CO_2$. At the end of the reflux period, after evolution of volatile products had ceased, the reaction product was dumped into alkaline water, washed, stabilized and steam distilled. The organic layer recovered from the steam distillation was dried and fractionally distilled.

The fractional distillation gave about 3% chloroform, much smaller quantities of methylene chloride and carbon tetrachloride, and almost 97% perchlorethylene. Total recovery was 98.5%.

EXAMPLE 3

A one liter batch of crude mixed chlorinated hydrocarbons containing at least four chlorinated hydrocarbons as major components was treated with 18 grams of anhydrous powdered ferric chloride for 18 hours. The lowest boiling major component was trichlorethylene. A total of 3.4 grams of HCl was evolved after which the mixture was washed, steam distilled from weakly alkaline water and fractionated. A liter of the same mixture was water washed, steam distilled and fractionated. The results of these treatments are shown in the following table:

*Comparison of fractionation of mixture of impure chlorinated hydrocarbons after aqueous alkali wash and after purification by the method of this invention*

| Components | Percent Recovery | |
|---|---|---|
| | Aqueous Alkali and Fractionation | Ferric Chloride and Fractionation |
| (1) Lights below tri | 39.0 | 2.6 |
| (2) Trichlorethylene | 3.0 | 45.5 |
| (3) Trichlorethylene to perchlorethylene-1,1,2-trichlorethane azeotrope | 8.7 | 2.7 |
| (4) Perchlorethylene-1,1,2-trichlorethane azeotrope | 4.1 | 4.6 |
| (5) Perchlorethylene-1,1,2-trichlorethane azeotrope to perchlorethylene | 23.6 | 10.0 |
| (6) Perchlorethylene | 9.4 | 22.9 |
| (7) Perchlorethylene to 1,1,2,2-tetrachlorethane | 2.9 | 1.9 |
| (8) 1,1,2,2-tetrachlorethane | 8.2 | 8.1 |
| (9) Loss | 2.5 | 1.5 |

EXAMPLE 4

The following example is given as an illustration of a suitable procedure for applying the process of the present invention to the mixture of Example 1 on a commercial scale.

(a) *Equipment.*—A 3,000 gallon steel reaction vessel fitted with a heating and cooling jacket, stirrer and vented reflux condenser is mounted so that two 500 gallon unheated tanks can be emptied into it by gravity. One of the 500 gallon tanks is used to make up a slurry of 350 pounds of finely divided anhydrous ferric chloride in the chlorinated hydrocarbon mixture to be treated. The other 500 gallon tank is used to make up a solution of 500 pounds of soda ash in water. Separate 500 gallon tanks are necessary to avoid the introduction of water into the reactor until desired.

(b) *Process.*—A partial charge of 1,500 gallons is placed in the reaction vessel. The charge is heated to boiling to thoroughly dry the charge and the reaction vessel. This is best accomplished by allowing the vapors from the boiling charge to rise through the reflux condenser and the vent line. It is particularly important that the entire system be dry to avoid very serious corrosion. After the drying step the reflux condenser cooling water can be turned on. It will be found best to have the reflux condenser drained of water during the drying step. After the system is on reflux the slurry of finely divided anhydrous ferric chloride is allowed to enter the reaction vessel. The system is maintained at a boil for 12 hours. The evolution of volatile acidic products should then have ceased. Dry nitrogen gas is then passed into the dome of the reactor to sweep out acidic fumes and to exclude air from the charge. The heat is then turned off and cooling water put in the jacket until the charge temperature is below 85° C. (i.e. the steam distillation point of perchlorethylene). The solution of 500 pounds of soda ash in 500 gallons of water is then allowed to enter the reaction vessel. After the charge is thoroughly washed by stirring to neutralize any acid materials and the ferric chloride the charge may be stabilized by addition of any of the various well-known trichlorethylene and perchlorethylene stabilizers in the appropriate amounts. The nitrogen can then be turned off.

The organic layer can then be directly steam distilled from the reaction vessel or transferred to a separate steam stripper for the steam distillation. The steam distillation residue, which will be substantially free of useful and valuable organics, can then be discarded. The distillate is separated from the water layer, dried and fractionally distilled.

The fractional distillation will be straightforward. After a trace of lights are removed, a clean cut of trichlorethylene is recovered, followed by a clean cut of the 1,1,2-trichlorethane perchlorethylene azeotrope and a clean cut of perchlorethylene. The still bottoms will consist of perchlorethylene and the 1,1,2,2-tetrachlorethane content of the original crude.

Having thus described our invention, we claim:

1. In a method of separating into a plurality of its component parts a mixture of liquid chlorinated hydrocarbons selected from the group consisting of trichlorethylene, beta trichlorethane, tetrachlorethane, pentachlorethane, perchlorethylene, ethylene dichloride, methylene chloride, chloroform and carbon tetrachloride, and containing impurities formed as a result of obtaining said chlorinated hydrocarbons by the chlorination of a hydrocarbon selected from the group consisting of ethane, ethylene and acetylene, the steps of heating the mixture to a temperature of at least 70° C. in the presence of solid anhydrous ferric chloride, thereby eliminating said impurities without substantial attack on the chlorinated hydrocarbons being separated, and then separating said plurality of individual liquid chlorinated hydrocarbons, free of said impurities, from the products of the ferric chloride reaction and from the ferric chloride.

2. The invention according to claim 1 wherein the temperature is the boiling point of the mixture.

3. The invention according to claim 1 wherein the solid ferric chloride is in finely divided form.

4. The invention according to claim 1 wherein the liquid chlorinated hydrocarbons include trichlorethylene.

5. The invention according to claim 1 wherein the liquid chlorinated hydrocarbons include perchlorethylene.

6. The invention according to claim 1 wherein the liquid chlorinated hydrocarbon mixture is treated with about 1% by weight of the solid anhydrous ferric chloride.

7. The invention according to claim 6 wherein the solid anhydrous ferric chloride is in finely divided form.

References Cited in the file of this patent

UNITED STATES PATENTS

| | | |
|---|---|---|
| 2,000,881 | Coleman | May 7, 1935 |
| 2,140,551 | Reilly | Dec. 20, 1938 |
| 2,297,564 | Kirkbride | Sept. 29, 1942 |
| 2,631,171 | Newcomer | Mar. 10, 1953 |